(12) United States Patent
Simonotti et al.

(10) Patent No.: US 6,179,457 B1
(45) Date of Patent: *Jan. 30, 2001

(54) ELECTRONIC CASH DISPENSER

(75) Inventors: Lucio Simonotti, Banchette; Carlo Follis, Alice Castello, both of (IT)

(73) Assignee: Siab Italia, S.p.A., Ivrea (IT)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/142,596

(22) PCT Filed: Mar. 4, 1997

(86) PCT No.: PCT/IT97/00044

§ 371 Date: Sep. 11, 1998

§ 102(e) Date: Sep. 11, 1998

(87) PCT Pub. No.: WO97/34267

PCT Pub. Date: Sep. 18, 1997

(30) Foreign Application Priority Data

Mar. 13, 1996 (IT) ............................... TO96A0195

(51) Int. Cl.⁷ .................................................. G07R 19/00
(52) U.S. Cl. .......................................... 364/408; 235/379
(58) Field of Search .............................. 364/408; 235/379

(56) References Cited

U.S. PATENT DOCUMENTS 4,757,185   7/1988   Onishi .
5,036,461 * 7/1991   Elliott et al. .................... 364/408

FOREIGN PATENT DOCUMENTS 0 661 676 A1   7/1995   (EP) .
WO 90/07756    7/1990   (WO) .
WO 94/11836    5/1994   (WO) .

OTHER PUBLICATIONS

Research Disclosure, "Hand-Held Keyboard Display On a Retracting Cable for a Self-Service Machine", No. 291, p. 475, 1988.

International Search Report.

* cited by examiner

Primary Examiner—Harold I. Pitts
(74) Attorney, Agent, or Firm—Banner & Witcoff, Ltd.

(57) ABSTRACT

This invention refers to an electronic cash dispenser (10) by means of which a user possessing a bank card (43 or 44) may withdraw cash after keying in a personal identification number and the amount to be withdrawn on a keyboard (31). The electronic cash dispenser (10) comprises a portable console (30) and allows the user both to withdraw cash by means of the banknote (14) dispensing unit (13) and also to credit the cash on a bank card (44) by means of a bank card (44) read/write device (34). The electronic cash dispenser (10) also allows banknotes (14) to be withdrawn, deducting the amount dispensed by the dispensing unit (13) from the amount credited on the user's bank card (44).

11 Claims, 3 Drawing Sheets

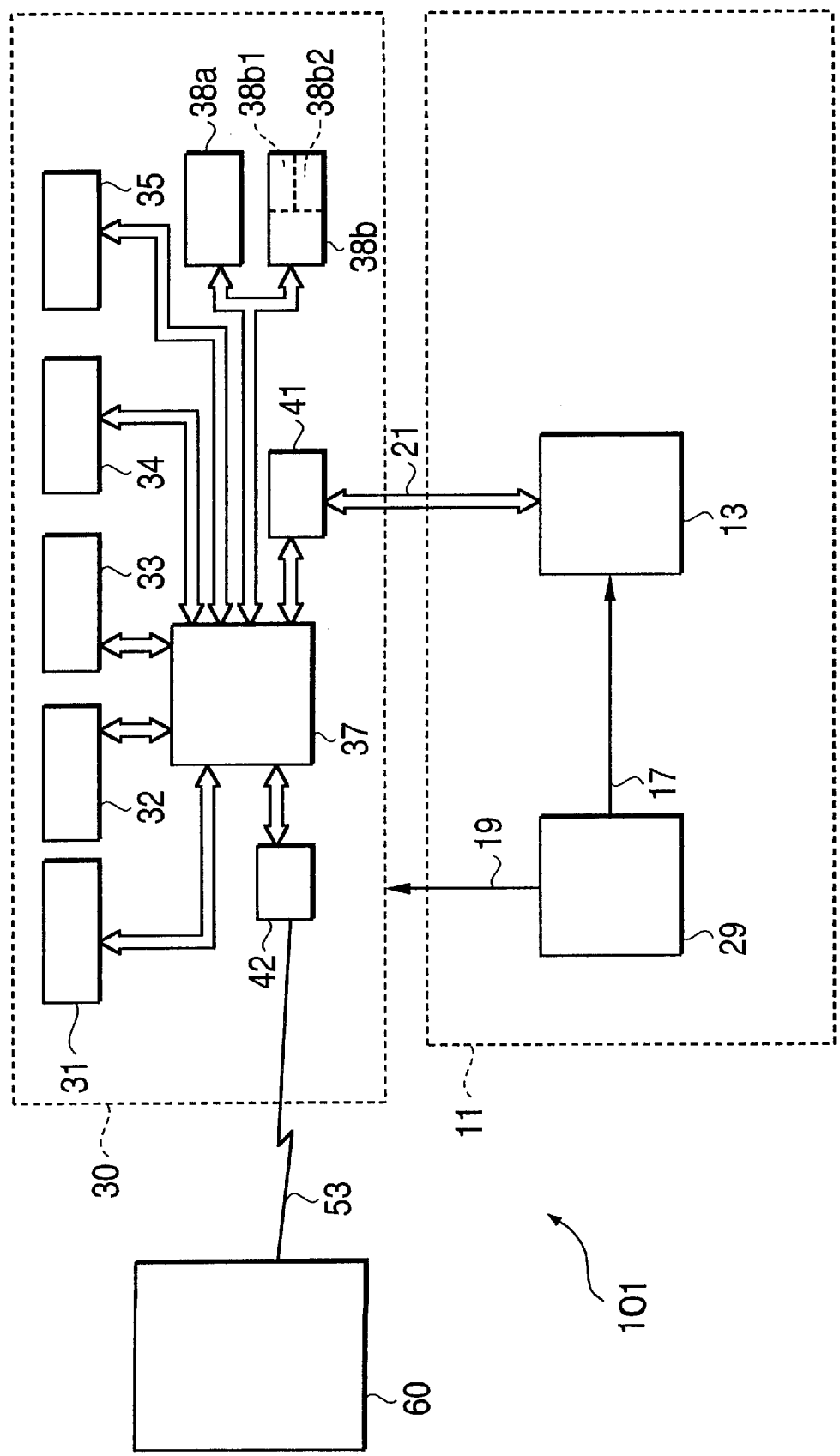

ELECTRONIC CASH DISPENSER

TECHNICAL FIELD

This invention refers to an electronic cash dispenser for dispensing cash, comprising a banknote dispensing unit, and a portable keyboard for entering data and commands and for determining the amount to be dispensed in cash.

BACKGROUND ART

In known banknote dispensing systems, commonly called Automatic Teller Machines (ATM), there is a fixed console having a display device, a reader for magnetic or intelligent bank cards, and a keyboard for entering the user's personal identification code.

These systems, in which the keyboard and display are fixed, preclude user security and confidentiality in the true sense of the word, whether the user wants to withdraw banknotes or obtain information on his current account.

In fact, any curious bystander behind the user can see the transactions carried out on the keyboard and also the information displayed on the display.

In order to improve security and confidentiality of user transactions, very often the consoles of "ATM" systems are placed in a room to which limited access is provided.

This is obviously a very costly solution requiring further control and security devices, such as for example, doors opened by electronic control means or other security systems.

In order to improve confidentiality, has been proposed, as described in European publication EP 661676 A1, an "ATM" system wherein the keyboard and the display are included in a portable console connected to the banknote dispensing unit by means of an armoured cable.

Such a system, even if it helps on improving confidentiality, does not solve the problem to improve security. In fact, with the above-cited system, the user is obliged to simultaneously control devices differently located. In particular, the user, by having the console in his hands, is obliged to manage, at the same time, the devices located in the fixed console. As a result the user can louse or forget to keep back the card. This last is not a costly solution, but is, in some way, more unsecured than to leave the keyboard an the display on the fixed console.

From European Publication EP 484198 A1, it is, also, known a portable console designed for making payments, as for example in a store or a trading centre.

Such a portable console comprises a keyboard, a display, a card reader and is remotely connectable through a radio link connection, to a transaction centre or a concentrator for making on line or off-line payments.

DISCLOSURE OF INVENTION

The technical problem that this invention proposes solving is that of producing an electronic cash dispenser system that eliminates the drawbacks of known dispenser systems and guarantees users a high level of confidentiality and security.

This technical problem is solved by the electronic cash dispenser according to the present invention, which is characterized by a portable reading/writing device for reading and/or writing bank cards and by a control unit connected to the banknote dispensing unit, to the portable keyboard and to the portable reading/writing device, and suitable for controlling operation thereof.

According to a further characteristic of this invention, the portable device for reading and writing intelligent cards, generally called "smart cards", is also utilizable for crediting smart cards with a given amount of money, withdrawing it from the user's current account.

According to another characteristic of this invention, the portable keyboard may also be used for withdrawing cash directly from the amount credited on the smart cards.

BRIEF DESCRIPTION OF DRAWINGS

These and other characteristics of this invention shall be clear from the following description of a preferred embodiment, provided by way of non-exhaustive example with the aid of the attached drawings, where:

FIG. 3 is a block diagram of one variant of the system of FIG. 1.

BEST MODE FOR CARRYING OUT THE INVENTION

Figure 1:
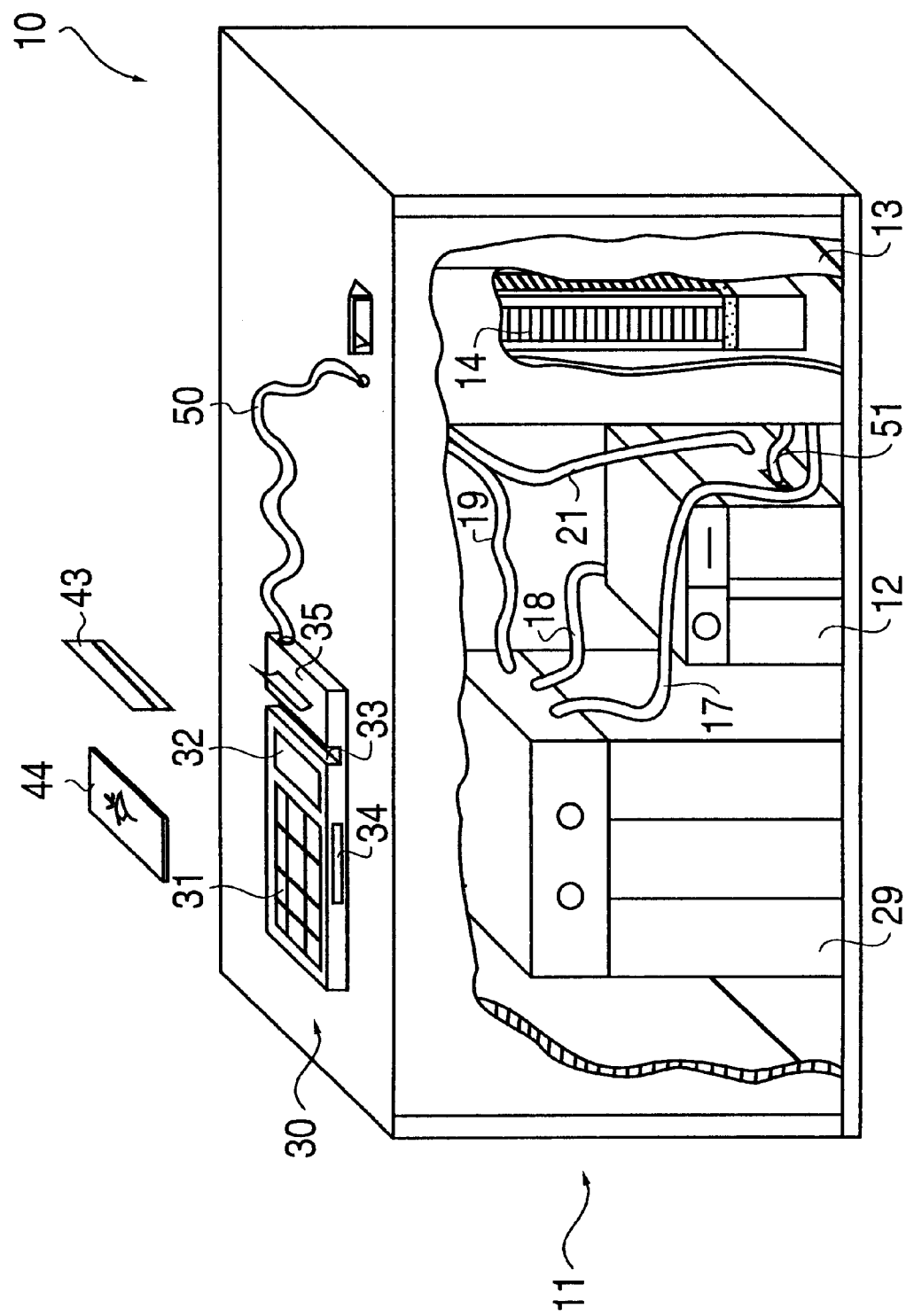
FIG. 1 is an overall view of the system according to this invention.

With reference to FIG. 1, the electronic cash dispenser 10 according to this invention comprises a portable console 30 and a safe 11, having inside a banknote 14 dispensing unit 13, a power supply 29 and a Personal Computer (PC) 12. The portable console 30 comprises a keyboard 31, a display 32, a badge reader 33 for reading known type magnetic cards (badges) 43, a read/write device (smart card r/w) 34 for reading and writing known type smart cards 44, and a printer 35.

Figure 2:
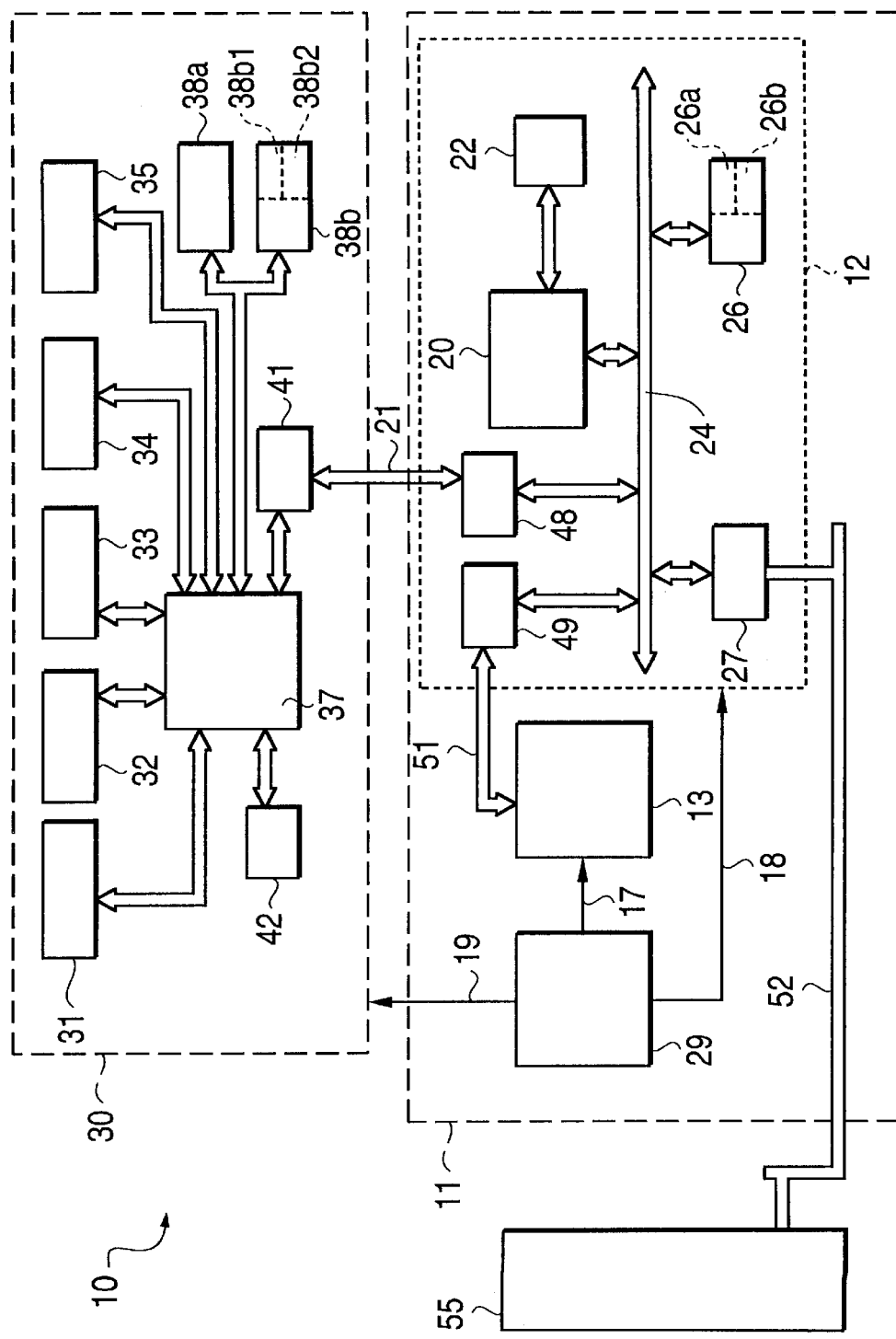
FIG. 2 is a block diagram of the system of FIG. 1.

The portable console 30 also comprises a logic unit 37 (FIG. 2) connected to the keyboard 31, to the display 32, to the badge reader 33, to the smart card r/w and to the printer 35 for controlling operation thereof.

Finally, the portable console 30 also comprises, connected to the logic unit 37, a first interface 41, for example of the RS-232 type, a second interface 42, of the modem type for example, both known in the art, suitable for being connected to external equipment items, and a console memory 38.

The console memory 38 comprises a first memory (console FLASH EPROM) 38a, for storing standard programs developed in the design stage of the electronic cash dispenser 10, and a second memory (console RAM) 38b. The console RAM 38b is intended for storing in a first area 38b1 predefined data such as, for example, messages to be displayed on the display 32 and, in a second area 38b2, variable data coming from the keyboard 31, from the badge reader 33, from the smart card r/w 34 or from external equipment items connected to the console 30.

The console 30, of known type, may consist of the "LYRA" model terminal produced by the Olivetti S.p.A. company.

The dispensing unit 13 (FIG. 1) for banknotes 14 is connected to the PC 12 by means of a known type serial cable 51, and is suitable for dispensing banknotes 14 in function of commands received through the serial cable 51.

The known type dispensing unit 13 may, for example, consist of the SD300 model produced by the DE LA RUE company.

The power supply 29 is designed to draw off electrical power from an external source, not shown, and distribute it to the dispensing unit 13, to the PC 12 and to the portable terminal 30 through electrical connections 17, 18 and 19.

The power supply 29 is also suitable for supplying sufficient electrical power to complete any transaction in progress on the electronic dispenser 10, should the power supplied by the external source be interrupted or suspended.

The known type power supply 29 may, for example, consist of the ECO500/SIAB model produced by the META company.

The PC 12 (FIG. 1 and FIG. 2) comprises a known type central processing unit (CPU) 20, a standard type data channel (BUS) 24, AT for example, and a random access memory (RAM) 22. The PC 12 also comprises a mass memory 26, comprising for example a known type hard disk unit, an electronic network board (LAN adapter) 27 and a first and second RS-232 serial port 48 and 49, again of known type.

The CPU 20, the mass memory 26, the LAN adapter 27 and the first and second serial port 48 and 49 are connected in a known way to the BUS 24 for transferring and exchanging data and commands among the units connected thereto.

The mass memory 26 is suitable for storing in a first area 26a programs developed in the electronic cash dispenser 10 design stage and, in a second area 26b, data regarding transactions carried out by the electronic dispenser 10, as will be described later in greater detail.

The RAM 22 is connected in a known way to the CPU 20 and is suitable for storing data coming from the portable console 30, as will be described later in detail.

The PC 12, of known type, may consist for example of the electronic circuit board of the M4-464 model produced by the Olivetti S.p.A. company.

The first serial port 48 of the PC 12 is connected by means of a connection cable 21 to the first interface 41 of the portable console 30 and is suitable for exchanging data and commands with the portable console 30; the second serial port 49 is connected by the serial cable 51 to the dispensing unit 13. The electric cable 19 and the cable 21 connecting the safe 11 (FIG. 1) and the portable console 30 have, in this embodiment, been brought together in a single flexible cable 50, of known type and designed to resist intrusion attempts by wrongdoers. The LAN adapter 27 (FIG. 2) is suitable for exchanging data in a known way, through network links 52, with a reference system 55.

The reference system 55 is suitable for enabling in a known way transactions on the electronic dispenser 10, as will be described later in greater detail.

Operation of the electronic cash dispenser 10 (FIG. 1 and FIG. 2) is as follows.

A user wanting to withdraw cash presses a key on the portable console 30 corresponding to the "withdraw cash from current account" function and inserts his badge 43 in the badge reader 33 or his smart card 44 in the smart card r/w 34.

The badge reader 33 or the smart card r/w 34 reads the information contained respectively in the badge 43 or in the smart card 44 and transmits it to the logic unit 37, which in turn passes the information in question, through the first interface 41, the connection cable 21 and the first serial port 48, to the CPU 20 for storage of the information in the RAM 22. The CPU 20, on the basis of the programs stored in the mass memory 26a, commands the logic unit 37 to extract from a first area of the console RAM 38b1 and display on the display 32 a message requesting the personal identification number (PIN) to be keyed in on the keyboard 31.

Following entry of the identification code, the logic unit 37 encrypts the identification code on the basis of a program stored in the console FLASH EPROM 38a corresponding to an equivalent decryption program stored in the mass memory 26a, and sends it to the CPU 20.

The encryption and decryption program can be specific for each portable console 30, so that only a particular portable console may be connected to a particular PC 12.

The CPU 20 decrypts the identification code, associates it with the data stored in the RAM 22 and sends them, through the network link 52, to the reference system 55 using the methods customary of cash withdrawal systems.

The reference system 55 checks in a known way that cash is available on the user's current account and, if all the checks are passed satisfactorily, sends the PC 12 a code enabling the same PC 12 to dispense cash. Accordingly, on being enabled, the PC 12 commands the control unit 37 to display on the display 32 a message requesting the user to key in the amount of cash desired.

If the user has used the badge 43, the amount keyed in on the keyboard 31 is transmitted by the logic unit 37 to the CPU 20 which immediately commands the dispensing unit 13 to dispense the amount in banknotes 14.

If the user has used the smart card 44, the CPU 20, after the amount has been keyed in, commands another message to be displayed on the display 32 requesting if the amount is to be dispensed in banknotes 14, or is instead to be credited on the smart card 44.

In the former case, operation is as described earlier. In the second case, the CPU 20 commands, through the logic unit 37, the smart card r/w 34 to record on the smart/card 44 the amount keyed in by the user.

On completion of one of these transactions, the CPU 20 transmits to the logic unit 37 data such as amount withdrawn, date and time of the transaction so that they can be printed on the printer 35 as a receipt of the transaction carried out and stores the data in the mass memory 26b, together with the data stored previously in the RAM 22.

It is obvious that the procedure described above may be varied in such a way that the user employs the badge 43 for entering the identification code and then uses the smart card 44 to withdraw the cash, having credited it on the smart card 44. But the electronic cash dispenser 10 can also permit withdrawal of banknotes 14 directly from the cash amount credited on the smart cards 44.

In fact, a user wishing to deposit or withdraw cash credited on his smart card 44, presses a key on the keyboard 31 corresponding to the "electronic purse" function and inserts in the console 30 the smart card 44 on which a cash credit and personal data have been recorded. The smart card r/w 34 reads the data, both personal and the credit, stored on the smart card 44 and sends them, in the same way as already described, to the RAM 22 for storage therein.

After the user's PIN has been keyed in and the usual checks have been passed satisfactorily, the CPU 20 extracts from the RAM 22 the data regarding the credit and sends them to the logic unit 37 to have them displayed on the display 32. The CPU 20 also commands the logic unit 37 to display on the display 32 a predefined message stored in a first area of the console RAM 38b1, asking if the user intends to deposit or withdraw cash against the credit amount appearing on the smart card 44.

Where the user, by selectively pressing one of the keys of the keyboard 31, opts to deposit the cash credited on the smart card 44, the CPU 20 sends the data concerning the user and the credit to the reference system 55 for them to be credited on the user's account; furthermore the CPU 20 commands, through the logic unit 37, the smart card r/w 34 to cancel the amount credited on the smart card 44.

Where the user, by selectively pressing a different key of the keyboard 31, opts to directly withdraw the cash credited on the smart card 44, the CPU 20 commands the logic unit 37 to display on the display 32 a predefined message asking the user what amount he wishes to withdraw from the smart card 44.

After this amount has been keyed in, the CPU 20 commands the dispensing unit 13 to dispense the amount in banknotes 14, deducts the amount withdrawn from the credit data previously stored in the RAM 22 and commands, through the logic unit 37, the smart card r/w to record on the smart card 44 the new credit duly calculated.

On completion of one of these transactions, the CPU 20 sends the logic unit 37 data such as amount withdrawn, date and time of the transaction so that they can be printed on the printer 35 as a receipt of the transaction carried out and stores the data in the second area 26b of the mass memory 26, together with the user data stored previously in the RAM 22.

The portable console 30 may also be used for maintenance functions, such as upgrading of the programs stored in the first area 26a of the HDU 26.

This function is activated, in the same way as already described, by pressing a predefined key on the keyboard 31 and using a badge 43 or a smart card 44.

Used in this way, the PC 12 will use a maintenance program stored in the first area 26a of the mass memory 26, suitable for allowing updating and control functions to be performed in a known way.

According to a second embodiment, an electronic cash dispenser 101 (FIG. 3) (hereinafter designated "reduced system") can also be produced in such a way that inside the safe 11 there is only the dispensing unit 13 and the power supply 29.

In the reduced system 101, the first interface 41 of the portable console 30 is connected directly by the connection cable 21, to the dispensing unit 13 and the second interface 42 of the portable console 30 is connected through a telephone line 53 to a remote system 60 suitable for performing some of the functions of the PC 12 (FIG. 2) and those of the reference system 55, as will be described later in detail.

In this second configuration, the portable console 30 (FIG. 3) is suitable for directly commanding activation of the dispensing unit 13 upon receipt of the enablement to dispense cash coming from the remote system 60.

According to a further variant, not shown in the figures, the portable console 30 may be connected, in the first configuration, to the PC 12 (FIG. 2) through an infrared ray connection, and in the second configuration to the remote system 60 (FIG. 3), through a radio link.

These further variants, though requiring a number of changes to the portable console 30 and to the PC 12, belong to the state of the art and do not depart from the scope of the invention. Operation of the reduced system 101 (FIG. 3) is as follows. A user wishing to withdraw cash presses the key of the portable console 30 corresponding to the "ATM" function and inserts his badge 43 in the badge reader 33 or his smart card 44 in the smart card r/w 34.

The badge reader 33 or the smart card r/w reads the information contained respectively in the badge 43 or in the smart card 44 and sends it to the logic unit 37 which stores the information in question in the second area of the console RAM 38b2 on the basis of a program stored in the console FLASH EPROM 38a.

Subsequently, the logic unit 37 extracts from the first area of the console RAM 38b1 and displays on the display 32 a message asking for the personal identification number (PIN) to be keyed in on the keyboard 31.

Following entry of the identification code, the logic unit 37 encrypts the identification code on the basis of an algorithm stored in the console FLASH EPROM 38a corresponding to an equivalent decryption algorithm stored in the remote system 60, stores it in the second area of the console RAM 38b2, associated with the information stored previously, and sends it to the remote system 60 through the telephone line 53.

The remote system 60 decrypts and checks the data, checks that cash is available on the user's current account and, if all the checks are passed satisfactorily, sends the control unit 37 a command to display on the display 32 a message asking the user to key in the cash amount he wishes to receive.

If the user has used the badge 43 (FIG. 1 and FIG. 3), the amount keyed in on the keyboard 31 is read and sent by the logic unit 37 to the dispensing unit 13, through the connection cable 21, so that, in the same way as already described, the dispensing unit 13 dispenses the amount in banknotes 14.

If the user has used the smart card 44, the control unit 37, after the amount has been keyed in, commands another message to be displayed on the display 32 requesting if the amount is to be dispensed in banknotes 14 or is instead to be credited on the smart card 44.

In the former case, operation is as described earlier. In the second case, the control unit 37 commands the smart card r/w 34 to record on the smart/card 44 the amount keyed in by the user. On completion of one of these transactions, the logic unit 37 commands the printer 35 to print a receipt of the transaction carried out and sends the remote system 60 the data regarding the amount withdrawn, together with the data stored previously in the second area of the console RAM 38b2 regarding the information contained in the badge 43 or in the smart card 44. In the same way as described before, the reduced system 101 also allows cash to be withdrawn using the cash availability stored on the smart card 44.

In fact, a user wishing to deposit or withdraw cash credited on his smart card 44, presses a key on the keyboard 31 corresponding to the "electronic purse" function and inserts in the console 30 the smart card 44 on which a cash credit and personal data have been recorded. The smart card r/w 34 reads the data, both personal and the credit, stored on the smart card 44 and sends them, in the same way as already described, to the logic unit 37 for storage in the second area of the console RAM 38b2.

Once the checks described previously for the reduced system 101 have been completed, the logic unit 37 extracts from the second area of the console RAM 38b2 the data regarding the credit and sends them to the display 32 for display thereupon.

The logic unit 37 also displays on the display 32 a predefined message stored in the first area of the console RAM 38b1, asking if the user intends to deposit or withdraw cash against the credit amount appearing on the smart card 44.

Where the user, by selectively pressing one of the keys of the keyboard 31, opts to deposit on his current account the cash credited on the smart card 44, the logic unit 37 sends the data regarding the user and the credit to the remote system 60, for it to be credited on the user's account, and zeroes the amount credited on the smart card 44.

Where the user, by selectively pressing a different key of the keyboard 31, opts to directly withdraw the cash credited on the smart card 44, the logic unit 37 displays on the display 32, in the same way as before, a message asking the user what amount he wishes to withdraw from the smart card 44.

After the amount has been keyed in, the logic unit 37 commands, again in the same way as already described for the reduced system 101, the dispensing unit 13 to dispense the amount in banknotes 14, deducts the amount withdrawn from the credit data previously stored in the second area of the console RAM 38$b$2 and commands the smart card r/w 34 to record on the smart card 44 the new credit duly calculated.

An completion of one of these transactions, the logic unit 37 commands the printer 35 to print a receipt of the transaction carried out and sends the remote system 60 the data concerning the transaction and the personal data stored previously in the second area of the console RAM 38$b$2.

The methods of operation described for both the electronic cash dispenser 10 (FIG. 2) and for the reduced system 101 (FIG. 3) may be integrated with further functions without modifying the architecture described or accordingly the substance of the invention.

The electronic cash dispenser, in its various configurations, permits not only a personal use of the console which, being portable, can be used in an extremely confidential way, but also allows banknotes to be withdrawn from the user's current account and from a credit stored on the smart card belonging to the user.

Additionally the electronic dispenser according to this invention allows the credit stored on the smart card of a user to be deposited on the user's current account.

What is claimed is:

1. An electronic cash dispenser (10) for dispensing cash, in particular banknotes (14), comprising
   a banknote dispensing unit (13); and
   a portable keyboard (31) connected to said banknote dispensing unit (13) for entering data and commands, and for determining the amount to be dispensed in cash; characterized by
   a portable reading/writing device (33, 34) for reading and/or writing bank cards (43, 44); and by
   a control unit (12, 37) connected to said banknote dispensing unit (13), to said portable keyboard (31) and to said portable reading/writing device (32, 34), and suitable for controlling operation thereof.

2. An electronic cash dispenser (10) according to claim 1 characterized in that said control unit (12, 37) is suitable for selectively commanding said dispensing unit (13) to dispense said amount in banknotes (14) and said portable reading/writing device (33, 34) to store said amount on said bank cards (43, 44).

3. An electronic cash dispenser (10) according to claim 1 characterized in that said control unit (12, 37) is suitable for commanding said dispensing unit (13) to dispense said amount in banknotes (14) and said portable reading/writing device (33, 34) to deduct the corresponding amount from said bank cards (43, 44).

4. An electronic cash dispenser (10) according to any one of the claims 1, 2 or 3 characterized in that said control unit (37) is associated to said portable keyboard (31) and to said portable reading/writing device (33, 34) in a portable console (30).

5. An electronic cash dispenser (10) according to any one of the claims 1, 2 or 3 characterized in that a display device (32) is associated to said portable keyboard (31) and to said portable reading/writing device (33, 34) in a portable console (30).

6. An electronic cash dispenser (10) according to claim 1, characterized in that said portable reading/writing device (33) is suitable for reading magnetic cards (43).

7. An electronic cash dispenser (10) according to any one of the claims 1, 2 or 3, characterized in that said portable reading/writing device (34) is suitable for reading/writing smart cards (44).

8. An electronic cash dispenser (10) according to claim 7, characterized in that a further reading/writing device (33) for reading and/or writing bank cards (43) is fitted on said portable console (30) and is suitable for reading magnetic cards (43).

9. An electronic cash dispenser (10) for dispensing cash, in particular banknotes (14), comprising
   a banknote dispensing unit (13), and
   a portable console (30) having a keyboard (31) for entering data and commands and determining the amount of cash to be dispensed; characterized in that said portable console (30) further comprises
   a reading/writing device (33, 34) for reading and/or writing bank cards (43, 44); and
   a control unit (37) connected to said banknote dispensing unit (13), to said keyboard (31) and to said reading/writing device (33, 34) for commanding said banknote dispensing unit (13) to dispense said amount in banknotes (14).

10. An electronic cash dispenser according to claim 9, characterized in that said portable console (30) further comprises a display device (32).

11. An electronic cash dispenser according to claim 9 or 10, characterised in that said control unit (37) is suitable for commanding said reading/writing device (33, 34) to deduct the corresponding amount from said bank cards (43, 44).

* * * * *